(12) United States Patent
Babian et al.

(10) Patent No.: US 12,401,253 B2
(45) Date of Patent: Aug. 26, 2025

(54) ELECTRIC MACHINE

(71) Applicant: Schaeffler Technologies AG & Co. KG, Herzogenaurach (DE)

(72) Inventors: Robin Babian, Baden-Baden (DE); Sven Derksen, Offenburg (DE); Thomas Niesen, Karlsruhe (DE); Cédric Blaes, Munchhausen (FR)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 234 days.

(21) Appl. No.: 18/037,613

(22) PCT Filed: Oct. 14, 2021

(86) PCT No.: PCT/DE2021/100826
§ 371 (c)(1),
(2) Date: May 18, 2023

(87) PCT Pub. No.: WO2022/105954
PCT Pub. Date: May 27, 2022

(65) Prior Publication Data
US 2024/0030775 A1    Jan. 25, 2024

(30) Foreign Application Priority Data
Nov. 19, 2020    (DE) .................... 10 2020 130 556.7

(51) Int. Cl.
*H02K 5/22* (2006.01)
*H02K 7/08* (2006.01)

(52) U.S. Cl.
CPC .............. *H02K 5/225* (2013.01); *H02K 7/08* (2013.01)

(58) Field of Classification Search
CPC .......... H02K 7/08; H02K 5/225; H02K 21/22; H02K 7/085; H02K 5/1732
See application file for complete search history.

(56) References Cited

U.S. PATENT DOCUMENTS

| | | | | |
|---|---|---|---|---|
| 4,083,817 A | * | 4/1978 | Anderson | C08L 61/34 523/144 |
| 2001/0017498 A1 | * | 8/2001 | Matsuoka | H02K 5/207 310/90 |

FOREIGN PATENT DOCUMENTS

| | | |
|---|---|---|
| DE | 405861 C | 11/1924 |
| DE | 3923421 | 1/1991 |
| EP | 1609228 B1 | 4/2008 |
| EP | 3361605 A1 | 8/2018 |

(Continued)

*Primary Examiner* — Terrance L Kenerly
(74) *Attorney, Agent, or Firm* — Volpe Koenig

(57) ABSTRACT

An electric machine for use within the powertrain of a hybrid or fully electric motor vehicle includes a stator and a rotor, said stator and rotor being received in an engine housing. The engine housing has at least one A-bearing shield and at least one B-bearing shield (6) for supporting the rotor relative to the engine housing, wherein the A-bearing shield and/or the B-bearing shield has/have a multipart design, in particular a two-part design, in each case comprising a respective annular inner shield and an annular outer shield, and the inner shield is arranged radially within the outer shield such that an annular space is formed between the inner shield and the outer shield. A connection shield is at least partly arranged in the annular space so that the inner shield and the outer shield are secured in the radial direction by the connection shield.

10 Claims, 7 Drawing Sheets

(56) References Cited

FOREIGN PATENT DOCUMENTS

| JP | 2013258913 A | 12/2013 |
|---|---|---|
| WO | 02103883 A1 | 12/2002 |
| WO | 2022105955 A1 | 5/2022 |

\* cited by examiner

ELECTRIC MACHINE

CROSS-REFERENCE TO RELATED APPLICATIONS

This application is the U.S. National Phase of PCT Appln. No. PCT/DE2021/100826 filed Oct. 14, 2021, which claims priority to DE 102020130556.7 filed Nov. 19, 2020, the entire disclosures of which are incorporated by reference herein.

TECHNICAL FIELD

The present disclosure relates to an electric machine, in particular for use within a powertrain of a hybrid or fully electric motor vehicle, comprising a stator and a rotor which are received in an engine housing, wherein the engine housing has at least one A-bearing shield and at least one B-bearing shield for supporting the rotor relative to the engine housing.

BACKGROUND

A generic electric machine, which has a stator and an internally running rotor, is disclosed in WO 02/103883 A1. For providing transport security, the stator of the electric machine comprises a radially extending section of a stator carrier with axial through-openings. The rotor has a rotor carrier with axial bores which are aligned with the through-openings in the stator and into which threaded sleeves are inserted. In this way, the rotor and stator can be securely positioned relative to one another by means of a screw connection, which is of particular importance for the transport and assembly of the electric machine in order to avoid damage to the rotor and/or the stator.

SUMMARY

The object of the disclosure is to provide an electric machine that is improved in terms of its transport security and ease of assembly.

This object is achieved by an electric machine, in particular for use within a powertrain of a hybrid or fully electric motor vehicle, comprising a stator and a rotor, which are received in an engine housing, wherein the engine housing has at least one A-bearing shield and at least one B-bearing shield for supporting the rotor relative to the engine housing, wherein the A-bearing shield and/or the B-bearing shield has/have a multipart design, in particular a two-part design, in each case comprising a respective annular inner shield and an annular outer shield, and the inner shield is arranged radially within the outer shield such that an annular space is formed between the inner shield and the outer shield, and a connection shield is at least partly arranged in the annular space, so that the inner shield and the outer shield are secured in the radial direction by the connection shield.

This has the advantage that the respective inner shield and outer shield are braced against one another via a separate connection shield, in order, for example, to intercept or compensate for acceleration forces or magnetic forces that occur during the transport of an electric machine and to ensure that the air gap is securely maintained between the rotor and the stator of the electric machine.

First, the individual elements of the claimed subject matter of the disclosure are explained herein and various embodiments of the subject matter of the disclosure are described below.

Electric machines are used to convert electrical energy into mechanical energy and/or vice versa, and generally include a stationary part referred to as a stator or armature, and a part referred to as a rotor or runner, and arranged to be movable relative to the stationary part. In the case of electric machines designed as rotary machines, a distinction is made in particular between radial flux machines and axial flux machines. A radial flux machine is characterized in that the magnetic field lines extend in the radial direction in the air gap formed between rotor and stator, while in the case of an axial flux machine the magnetic field lines extend in the axial direction in the air gap formed between rotor and stator.

The electric machine is intended in particular for use within a powertrain of a hybrid or fully electric motor vehicle.

In particular, the electric machine is dimensioned in such a way that vehicle speeds of more than 50 km/h, preferably more than 80 km/h and in particular more than 100 km/h can be achieved. The electric motor particularly preferably has an output of more than 30 kW, preferably more than 50 kW and in particular more than 70 kW. Furthermore, it is preferred that the electric machine provides speeds greater than 5,000 rpm, particularly preferably greater than 10,000 rpm, very particularly preferably greater than 12,500 rpm.

The electric machine is preferably designed as a radial flux machine. The stator of a radial flux machine is preferably constructed cylindrically and in particular consists of electrical laminations that are electrically insulated from one another and are constructed in layers and packaged to form laminated cores. With this structure, the eddy currents in the stator caused by the stator field are kept low. Distributed over the circumference, grooves or peripherally closed recesses are preferably embedded into the electrical lamination running parallel to the rotor shaft, and accommodate the stator winding or parts of the stator winding. On the basis of the construction towards the surface, the slots can be closed with locking elements such as locking wedges or covers or the like to prevent the stator winding from being detached.

A rotor is the rotating (spinning) part of an electric machine. The rotor comprises a rotor shaft and one or more rotor bodies arranged in a non-rotatable manner on the rotor shaft. The rotor shaft can be hollow, which on the one hand saves weight and on the other hand allows lubricant or coolant to be supplied to the rotor body.

The gap between the rotor and the stator is called the air gap. In a radial flux machine, this is an annular gap with a radial width that corresponds to the distance between the rotor body and the stator body.

The engine housing encloses the electric machine. An engine housing can also accommodate the control and power electronics. The engine housing can furthermore be part of a cooling system for the electric machine, and can be designed in such a way that cooling fluid can be supplied to the electric machine via the housing and/or the heat can be dissipated to the outside via the housing surfaces. In addition, the engine housing protects the electric machine and any electronics that might be present from external influences.

An engine housing can be formed in particular from a metallic material. Advantageously, the engine housing can be formed from a cast metal material, such as gray cast iron or cast steel. In principle, it is also conceivable to form the engine housing entirely or partially from a plastic.

Bearing shields are the rear and front covers of the engine housing, which protect the inside of the electric machine against contact, for example, and accommodate the bearings of the shaft ends of the rotor. They are usually very precisely fitted into the engine housing to ensure that the air gap between the stator and rotor is as uniform as possible. The A-bearing shield designates the output side and usually carries a fixed bearing, while the B-bearing shield is the fan side and the bearing can usually be implemented using a sliding seat in order to be able to compensate for thermal expansion of the rotor.

The A-bearing shield and/or the B-bearing shield can have a one-piece or multipart design, in particular a two-part design. In the case of a two-part design of a bearing shield in particular, an inner shield can be arranged radially inside an outer shield.

It is particularly preferred that a bearing shield is formed from a metallic material. In principle, however, it can also be possible for a bearing shield to be formed from a plastic, in particular a fiber-reinforced plastic.

According to an advantageous embodiment of the disclosure, it can be provided that the inner shield, the outer shield and the connection shield are formed in such a way that the outer shield is secured relative to the inner shield in at least one axial direction, preferably in both axial directions, in a form-fitting manner.

According to a further preferred development of the disclosure, it can also be provided that the inner shield and/or the outer shield has at least one first form-fitting means, which interacts with at least one corresponding second form-fitting means of the connection shield in such a way that the inner shield and the connection shield are secured to one another in the circumferential direction or the outer shield and the connection shield are secured to one another in the circumferential direction.

Furthermore, according to an equally advantageous embodiment of the disclosure, it can be provided that the connection shield has an annular base body, from which a plurality of centering lugs distributed over the circumference of the base body extend in the axial direction into the interior of the electric machine, which abut the inner shield or outer shield.

According to a further particularly preferred embodiment of the disclosure, provision can be made for a plurality of securing lugs that can be pivoted in a spring-elastic manner in the radial direction, distributed over the circumference of the base body, to be arranged extending from the annular base body in the axial direction into the interior of the electric machine, which engage behind a securing section of the inner shield or outer shield.

Furthermore, the disclosure can also be further developed such that a cable duct is formed on the annular base body, in particular for accommodating electrical lines of a temperature and/or rotor position sensor, which extends outwards from the base body in a radial or axial direction.

In an equally preferred alternative embodiment of the disclosure, it can also be provided that, at distal end of the cable duct, a connector socket is included for the, in particular detachable, fixing of at least one connector, which is connected in particular to an electrical line of a temperature and/or rotor position sensor. The connector socket and the shape of the cable duct can preferably define an exact positioning of one or more connectors for an interface, for example a control device, so that, for example, a blind assembly of a connector fixed in this way can be implemented.

It can also be advantageous to further develop the disclosure such that reinforcing ribs are formed in the area of the centering lugs, which extend out of the base body in the axial and/or radial direction, whereby the base body can be structurally reinforced.

According to a further preferred embodiment of the subject matter of the disclosure, it can be provided that the connection shield is formed from a plastic, in particular from a fiber-reinforced plastic. Finally, the disclosure can also be implemented in an advantageous manner in that the connection shield is designed in one piece. The connection shield is preferably produced by an injection molding process.

BRIEF DESCRIPTION OF THE DRAWINGS

The disclosure will be explained in more detail below with reference to figures without limiting the general concept of the disclosure.

In the figures.

DETAILED DESCRIPTION

Figure 1:
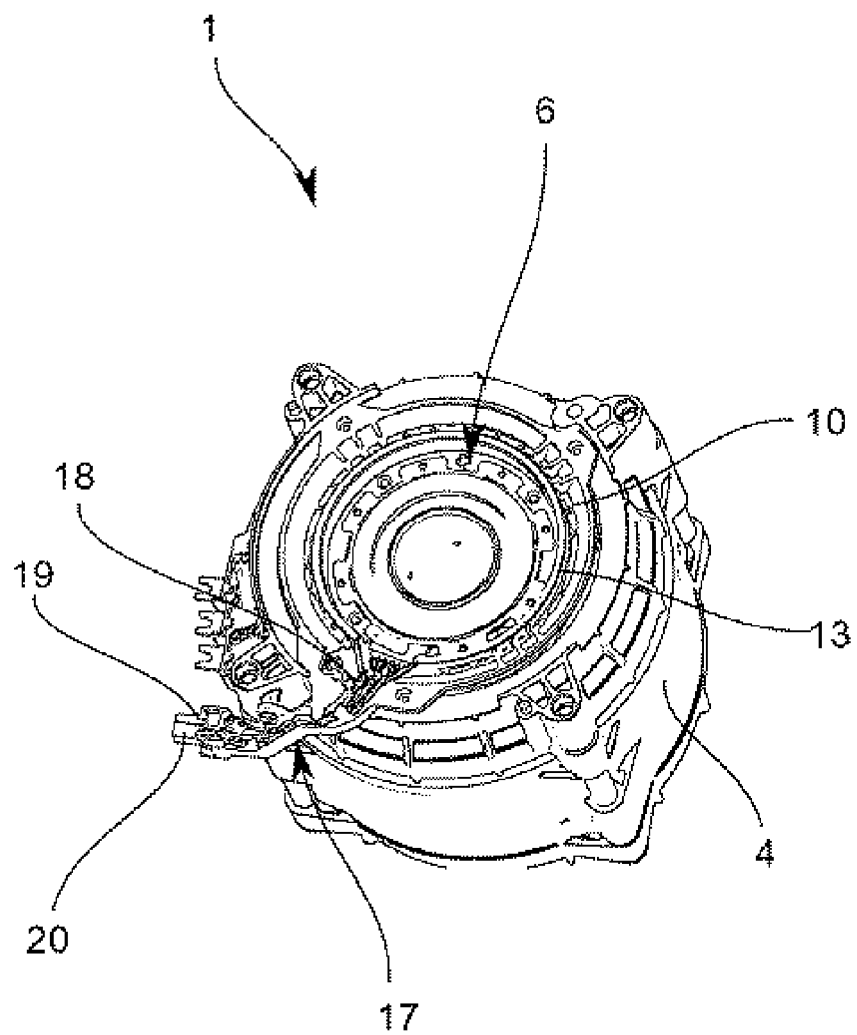
FIG. 1 shows an electric machine in a perspective view.
Figure 7:
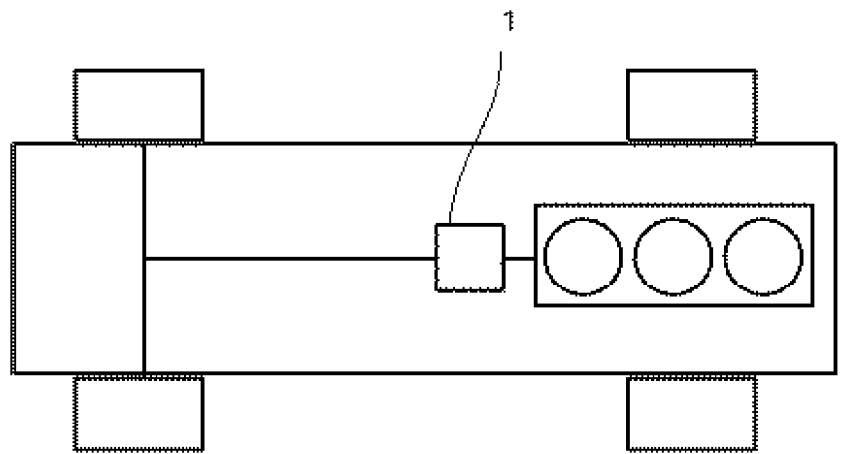
FIG. 7 shows a motor vehicle with an electric machine in a block diagram.
Figure 7:
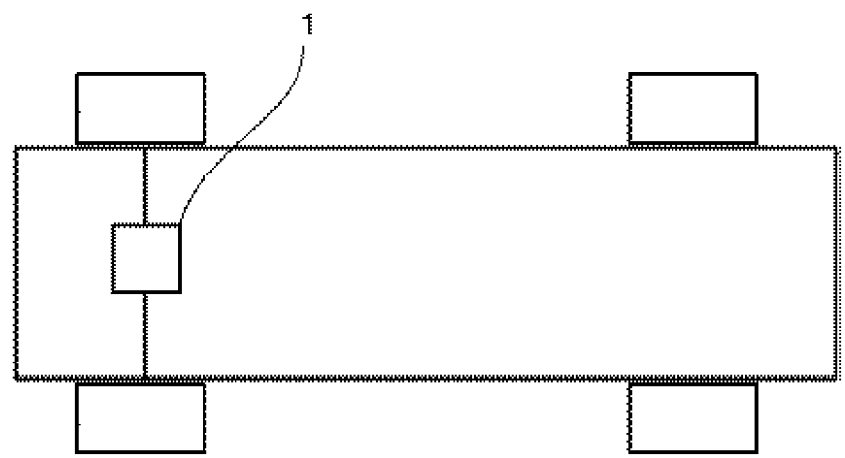

FIG. 1 shows an electric machine 1, in particular for use within a powertrain of a hybrid or fully electric motor vehicle, as shown in FIG. 7, for example.

Figure 2:
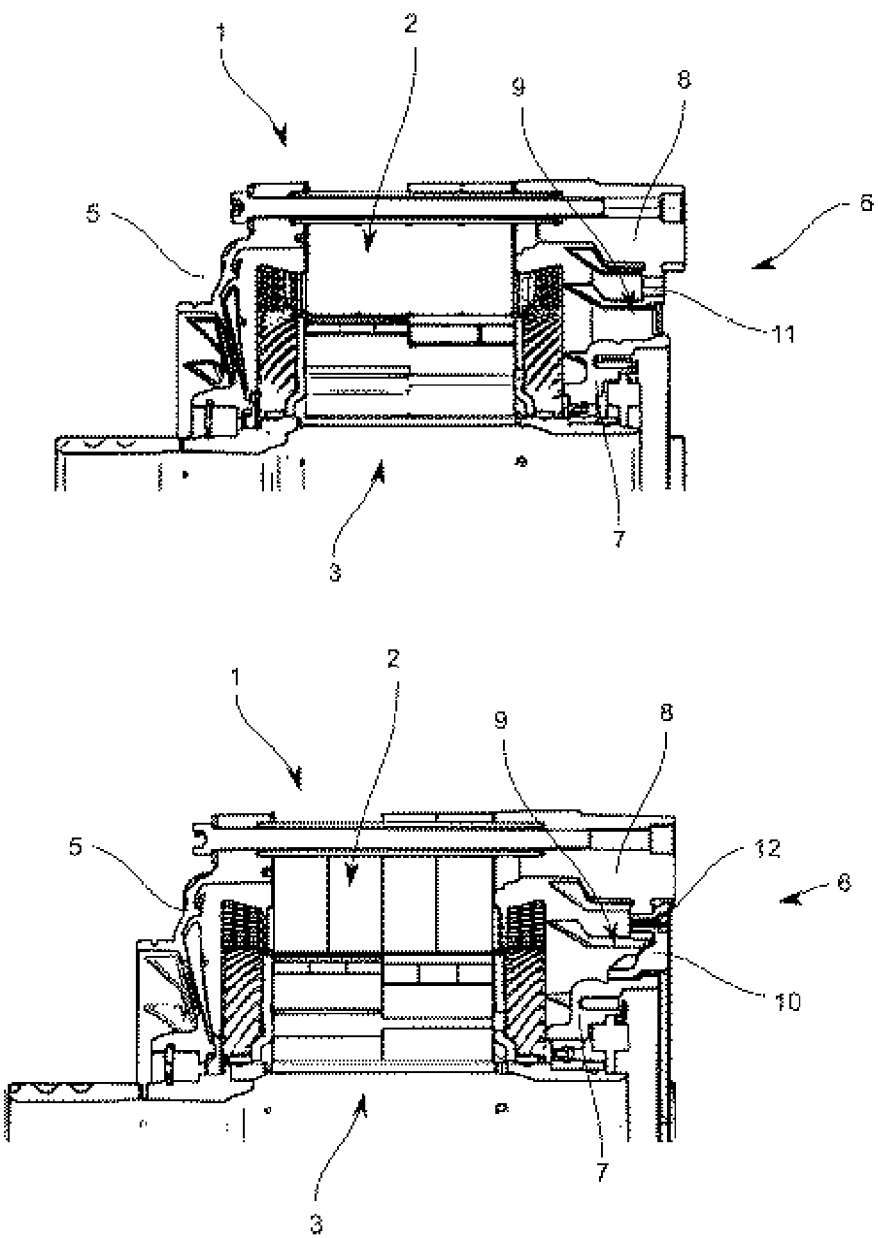
FIG. 2 shows an electric machine in an axial sectional view with the connection shield inserted (below) and without the connection shield inserted (above)

The electric machine 1 has a stator 2 and a rotor 3 which are received in an engine housing 4. As shown in FIG. 2, the engine housing 4 has at least one A-bearing shield 5 and at least one B-bearing shield 6 for supporting the rotor 3 relative to the engine housing 4

In the embodiment shown, the A-bearing shield 5 has a one-piece design and the B-bearing shield 6 has a two-part design. The two-part B-bearing shield 6 formed from a metallic material has an annular inner shield 7 and an annular outer shield 8, wherein the inner shield 7 is arranged radially within the outer shield 8 in such a way that an annular space 9 is formed between the inner shield 7 and the outer shield 8.

A connection shield 10 formed from a plastic is arranged in the annular space 9 so that the inner shield 7 and the outer shield 8 are fixed in the radial direction by the connection shield 10. The connection shield 10 rests with its radially inner circumference on the inner shield 7 by means of centering lugs 14, which will be explained in more detail below.

The outer shield 8 also has first form-fitting means 11 designed as a bore, which interact with second form-fitting means 12 of the connection shield 10 designed as corresponding axially-running pins in such a way that the outer shield 8 and the connection shield 10 are secured to one another in the circumferential direction. For this purpose, the pins engage in the bores in the outer shield 8. This also causes the connection shield 10 to be secured in relation to the outer shield 8 in the radial direction.

It can also be seen clearly from FIG. 2 that the connection shield 10 can be inserted in the annular space 9 between the inner shield 7 and the outer shield 8 from the axial direction.

Figure 3:
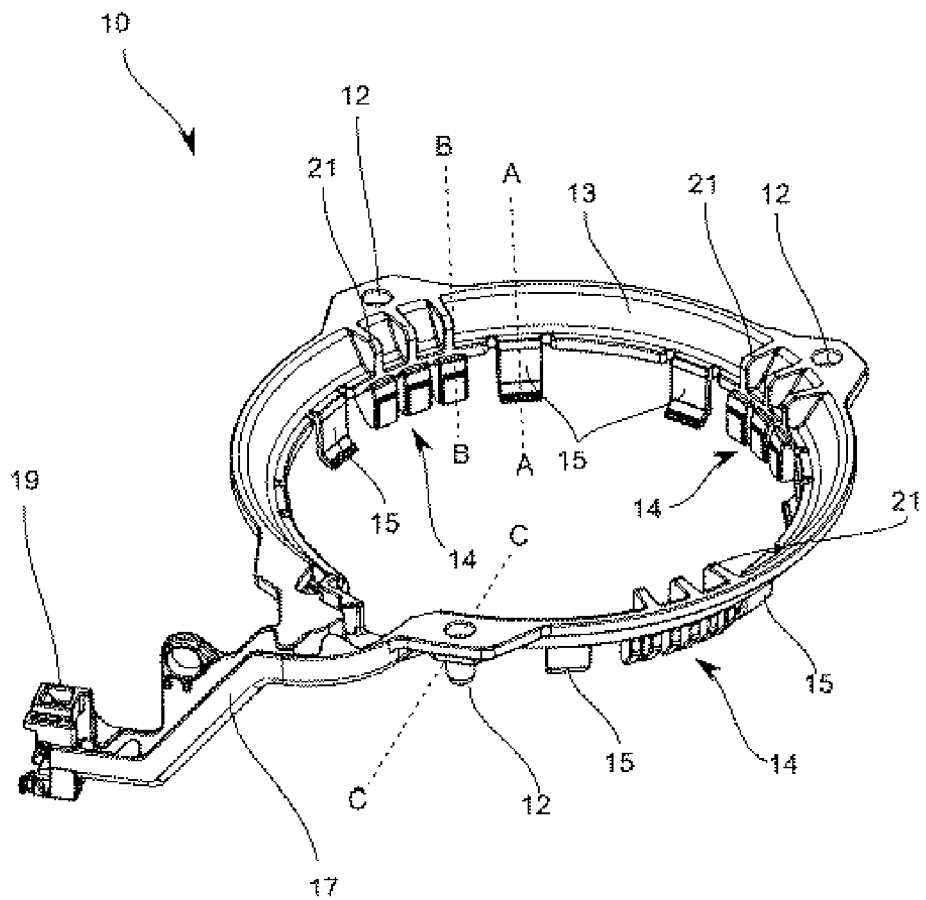
FIG. 3 shows a connection shield in a perspective view.

As shown in FIG. 3, the connection shield 10 has an annular base body 13, from which a plurality of centering lugs 14, distributed over the circumference of the base body 13, extend in the axial direction into the interior of the electric machine 1 and abut on the inner shield 7. In the embodiment shown, a total of three groups of centering lugs 14 are distributed over the circumference of the base body 13. Each group of centering lugs 14 has three centering lugs 14. Securing lugs 15 are arranged in the circumferential direction on both sides of a group of centering lugs 14, the function of which will now be explained further below.

FIG. 3 also shows that reinforcing ribs 21 are formed in the area of the centering lugs 14 and extend out of the base body 13 in the axial and/or radial direction. In the embodiment shown in FIG. 3, each of the centering lugs 14 is assigned a reinforcing rib 21. The reinforcing ribs 21 each run in a radial plane.

Figure 4:
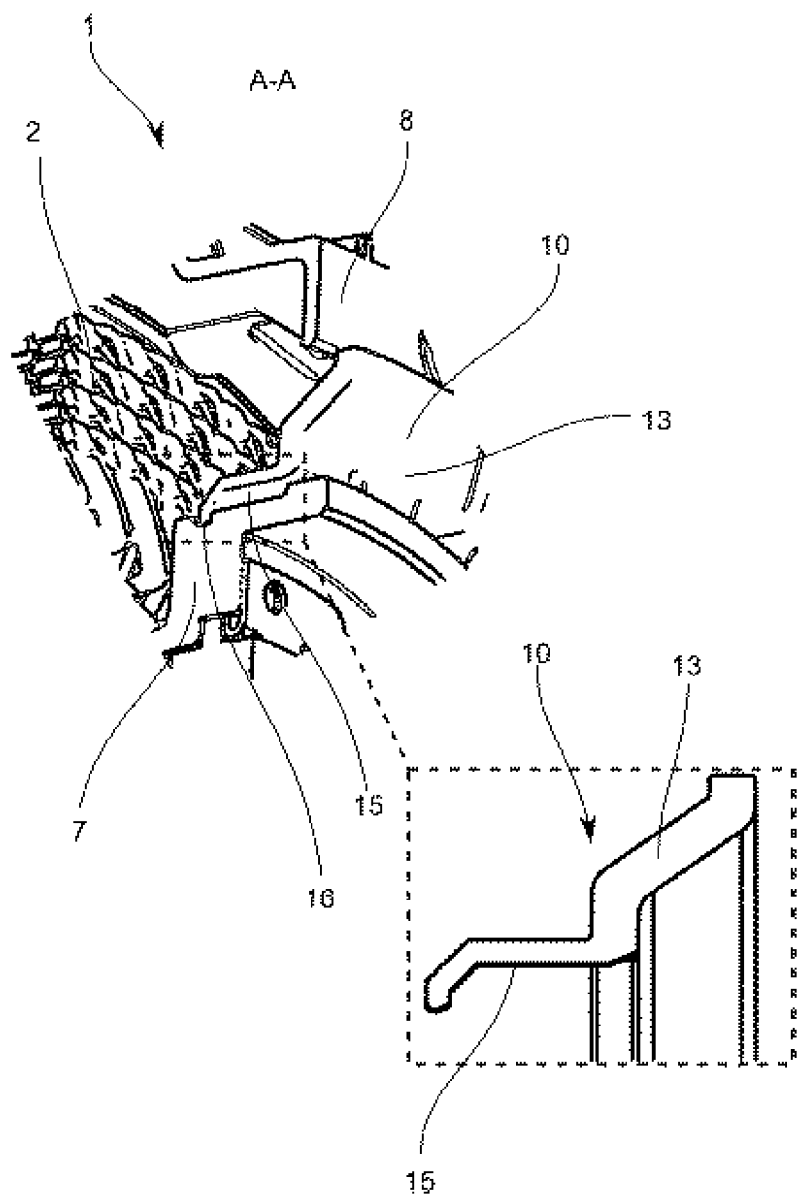
FIG. 4 shows a perspective partial section detail view of a connection shield.

FIG. 3 also shows that a plurality of securing lugs 15 that can be pivoted in a spring-elastic manner in the radial direction, distributed over the circumference of the base body 13, are arranged extending from the annular base body 13 in the axial direction into the interior of the electric machine 1, which engage behind a securing section 16 of the inner shield 7, which can be seen particularly clearly in FIG. 4.

The securing section 16 is designed as a circumferential, annular groove in the inner shield 7 that extends in the radial direction into the inner shield 7. The securing lugs 17 have a corresponding section pointing radially inwards, which can engage in the groove and thus fixes the connection shield 10 relative to the inner shield 7 in both axial directions.

From FIG. 4—in particular the detailed representation of the connection shield 10 in a cross-sectional view—it can be seen that the base body 13 extends at an angle to an imaginary radial plane, so that the base body 13 assumes a disk-spring-like three-dimensional shape.

Figure 5:
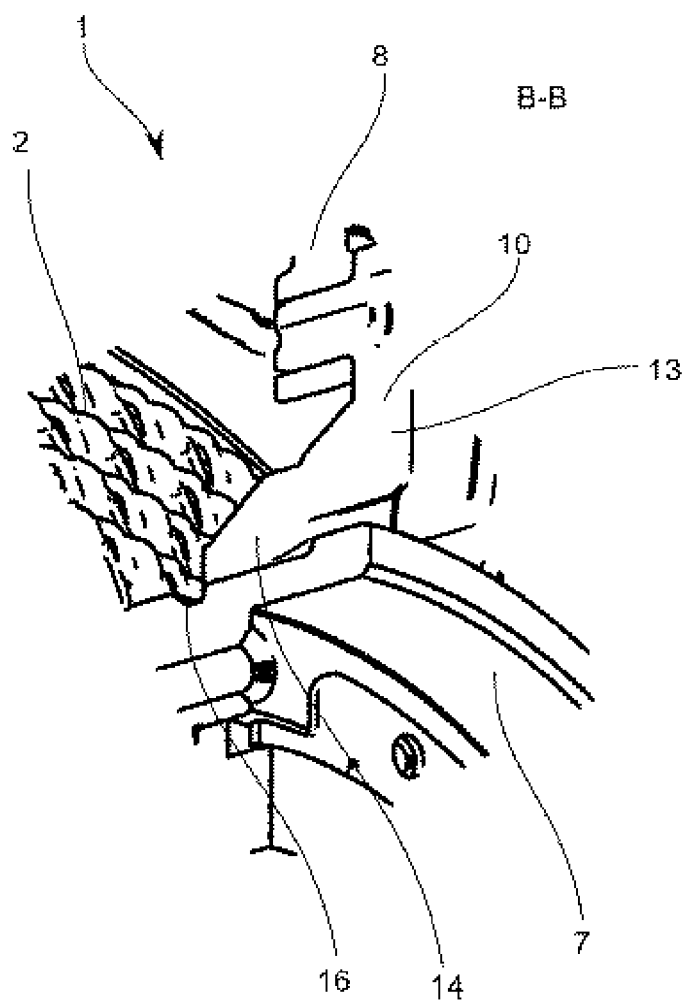
FIG. 5 shows a perspective partial section detail view of a connection shield.

As can be seen from FIG. 5, the centering lugs 14 abut on the outer lateral surface of the annular inner shield 7. They have a smaller extent in the axial direction than the securing lugs 17.

Figure 6:
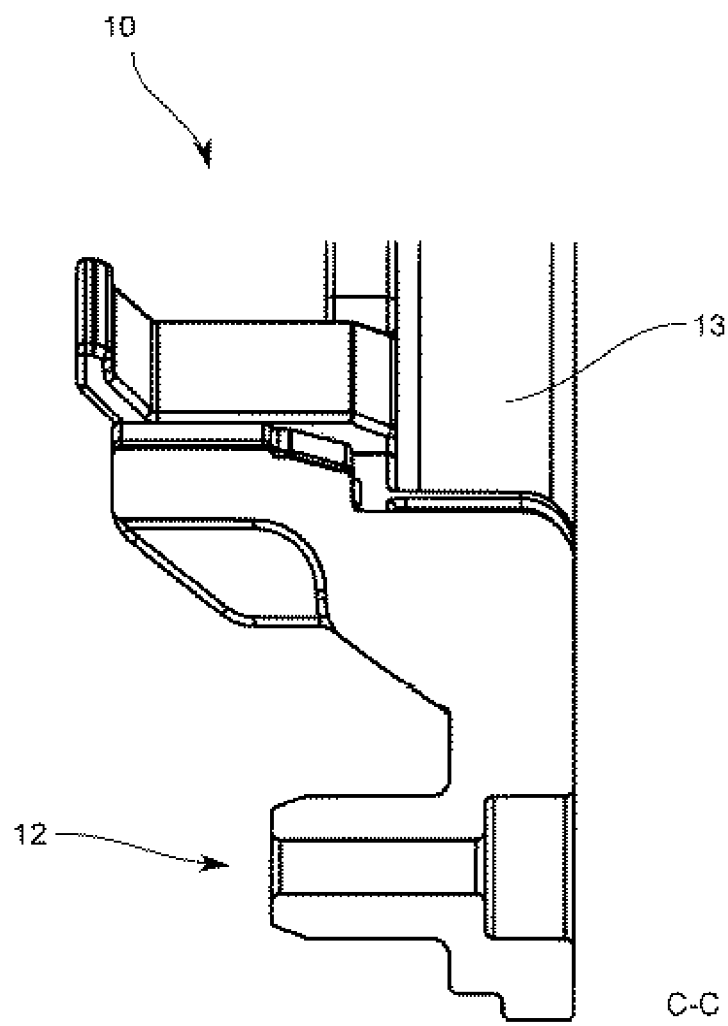
FIG. 6 shows a perspective partial section detail view of a connection shield.

Looking at FIG. 2 and FIG. 4 together, it can be seen that the inner shield 7, the outer shield 8 and the connection shield 10 are formed in such a way that the outer shield 8 is secured relative to the inner shield 7 in both axial directions in a form-fitting manner. The two-sided axial securing takes place—as described above—between the inner shield 7 and the intermediate shield 10 by means of a form-fit between the securing lugs 15 and the securing section 16 and between the outer shield 8 and the intermediate shield 10 by means of the form-fitting means 11, 12, wherein here the axial securing on both sides can also take place in a force-fitting manner, for example by screwing a securing screw into the form-fitting means 12 of the intermediate shield 10, as is shown, for example, in FIG. 6.

FIG. 3 also shows that a cable duct 17 for accommodating electrical lines 18 of a temperature and/or rotor position sensor is formed on the annular base body 13. The cable duct 17 extends outwards from the base body 13 in the radial direction. At the distal end of the cable duct 17, there is a connector socket 19 for detachably fixing at least one connector which is connected in particular to an electrical line 18 of a temperature and/or rotor position sensor. The cable duct 17 has openings on its side that is accessible from the axial direction, through which the electrical lines 18 can be inserted into the cable duct 17.

The connection shield 10 is formed in one piece from a plastic, in particular a fiber-reinforced plastic.

The disclosure is not limited to the embodiments shown in the figures. The above description is therefore not to be regarded as limiting, but rather as illustrative. The following claims are to be understood as meaning that a named feature is present in at least one embodiment of the disclosure. This does not exclude the presence of further features. If the patent claims and the above description define 'first' and 'second' features, this designation serves to distinguish between two features of the same type without defining an order of precedence.

LIST OF REFERENCE SYMBOLS

1 Machine
2 Stator
3 Rotor
4 Engine housing
5 A-bearing shield
6 B-bearing shield
7 Inner shield
8 Outer shield
9 Annular space
10 Connection Shield
11 Form-fitting means
12 Form-fitting means
13 Base body
14 Centering lugs
15 Securing lugs
16 Securing section
17 Cable channel
18 Lines
19 Connector socket
20 Connector
21 Reinforcement ribs

The invention claimed is:

1. An electric machine for use within a powertrain of a hybrid or fully electric motor vehicle, comprising:
   a stator and a rotor, said stator and rotor being received in an engine housing, wherein the engine housing has at least one A-bearing shield and at least one B-bearing shield for supporting the rotor relative to the engine housing,
   wherein:
   the A-bearing shield and the B-bearing shield have a multipart design, in each case comprising a respective annular inner shield and an annular outer shield, wherein the inner shield is arranged radially within the outer shield such that an annular space is formed between the inner shield and the outer shield, and a connection shield is at least partly arranged in the annular space so that the inner shield and the outer shield are secured in a radial direction by the connection shield;
   the connection shield has an annular base body, from which a plurality of centering lugs distributed over a circumference of the base body extend in an axial direction into an interior of the electric machine and which abut on the inner shield or outer shield; and
   a plurality of securing lugs that can be pivoted in a spring-elastic manner in a radial direction, distributed over the circumference of the base body are arranged extending from the annular base body in the axial direction into the interior of the electric machine, which engage behind a securing section of the inner shield or outer shield.

2. The electric machine according to claim 1, wherein:
the inner shield, the outer shield and the connection shield are formed in such a way that the outer shield is secured relative to the inner shield in at least one axial direction in a form-fitting manner.

3. The electric machine according to claim 1, wherein:
the inner shield and the outer shield has at least one first form-fitting means which interacts with at least one corresponding second form-fitting means of the connection shield in such a way that the inner shield and the connection shield are secured relative to one another in a circumferential direction, or the outer shield and the connection shield are secured relative to one another in the circumferential direction.

4. The electric machine according to claim 1, wherein:
the connection shield is formed from a plastic.

5. The electric machine according to claim 1,
the connection shield is designed in one piece.

6. The electric machine according to claim 1, wherein the inner shield, the outer shield and the connection shield are formed in such a way that the outer shield is secured relative to the inner shield in both axial directions in a form-fitting manner.

7. The electric machine according to claim 1, wherein the connection shield is formed from a fiber-reinforced plastic.

8. An electric machine for use within a powertrain of a hybrid or fully electric motor vehicle, comprising:
a stator and a rotor, said stator and rotor being received in an engine housing, wherein the engine housing has at least one A-bearing shield and at least one B-bearing shield for supporting the rotor relative to the engine housing,
wherein:
the A-bearing shield and the B-bearing shield have a multipart design, in each case comprising a respective annular inner shield and an annular outer shield, wherein the inner shield is arranged radially within the outer shield such that an annular space is formed between the inner shield and the outer shield, and a connection shield is at least partly arranged in the annular space so that the inner shield and the outer shield are secured in a radial direction by the connection shield;
the connection shield has an annular base body, from which a plurality of centering lugs distributed over a circumference of the base body extend in an axial direction into an interior of the electric machine and which abut on the inner shield or outer shield; and
a cable duct is formed on the annular base body for accommodating electrical lines of a temperature or rotor position sensor, which extends outwards from the base body in a radial or axial direction.

9. The electric machine according to claim 8, wherein:
at a distal end of the cable duct, there is a connector socket for fixing at least one connector in a detachable manner, which is connected to an electrical line of the temperature or rotor position sensor.

10. An electric machine for use within a powertrain of a hybrid or fully electric motor vehicle, comprising:
a stator and a rotor, said stator and rotor being received in an engine housing, wherein the engine housing has at least one A-bearing shield and at least one B-bearing shield for supporting the rotor relative to the engine housing,
wherein:
the A-bearing shield and the B-bearing shield have a multipart design, in each case comprising a respective annular inner shield and an annular outer shield, wherein the inner shield is arranged radially within the outer shield such that an annular space is formed between the inner shield and the outer shield, and a connection shield is at least partly arranged in the annular space so that the inner shield and the outer shield are secured in a radial direction by the connection shield;
the connection shield has an annular base body, from which a plurality of centering lugs distributed over a circumference of the base body extend in an axial direction into an interior of the electric machine and which abut on the inner shield or outer shield; and
reinforcing ribs are formed in an area of the centering lugs and extend out of the base body in an axial or radial direction.

\* \* \* \* \*